US010873669B2

(12) United States Patent
Gan et al.

(10) Patent No.: US 10,873,669 B2
(45) Date of Patent: Dec. 22, 2020

(54) SERVICE DIFFERENTIATION FOR DEVICES CONNECTED TO A UE AS A ROUTER

(71) Applicant: Telefonaktiebolaget LM Ericsson (publ), Stockholm (SE)

(72) Inventors: Juying Gan, Shanghai (CN); Susana Fernandez Alonso, Madrid (ES); Hui Yang, Shanghai (CN); Jinyin Zhu, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 44 days.

(21) Appl. No.: 16/347,754

(22) PCT Filed: Nov. 1, 2017

(86) PCT No.: PCT/CN2017/108886
§ 371 (c)(1),
(2) Date: May 6, 2019

(87) PCT Pub. No.: WO2018/082559
PCT Pub. Date: May 11, 2018

(65) Prior Publication Data
US 2019/0289136 A1    Sep. 19, 2019

(30) Foreign Application Priority Data
Nov. 7, 2016 (WO) ................ PCT/CN2016/104944

(51) Int. Cl.
*H04M 15/00* (2006.01)
*H04W 76/12* (2018.01)
(Continued)

(52) U.S. Cl.
CPC ........ *H04M 15/66* (2013.01); *H04L 12/1407* (2013.01); *H04L 45/74* (2013.01);
(Continued)

(58) Field of Classification Search
CPC ...... H04M 15/66; H04M 15/57; H04M 15/63; H04W 76/12; H04W 76/14; H04W 88/04;
(Continued)

(56) References Cited

U.S. PATENT DOCUMENTS 10,517,013 B2 * 12/2019 Jeong ................ H04W 28/0268
2010/0039936 A1    2/2010 Jin et al.
(Continued)

FOREIGN PATENT DOCUMENTS

CN    103037449 A    4/2013
CN    103348717 A    10/2013
(Continued)

OTHER PUBLICATIONS

Supplemental European Search Report dated Apr. 16, 2020 issued in European Patent Application No. 17867696. (7 pages).
(Continued)

*Primary Examiner* — Michael J Moore, Jr.
(74) *Attorney, Agent, or Firm* — Rothwell, Figg, Ernst & Manbeck, P.C.

(57) ABSTRACT

The embodiments herein relate to a method in a PCRF (108) for achieving service differentiation for a second UE (103) attached to a first UE (101) acting as a mobile router. The PCRF (108) receives, from a further node (107), a request for establishing a PDN connection for the first UE (101). The request comprises routing information of the first UE (101). The PCRF (108) receives, from an AF (140), a request for resource reservation for a service based on a request from the second UE (103). The request comprises an IP address of the second UE (103). The PCRF (108) correlates the routing information of the first UE (101) with the IP address of the second UE (103).

26 Claims, 9 Drawing Sheets

(51) Int. Cl.
*H04L 12/14* (2006.01)
*H04L 12/741* (2013.01)
*H04L 29/12* (2006.01)
*H04W 88/04* (2009.01)
*H04W 76/14* (2018.01)
*H04W 92/24* (2009.01)
*H04W 76/15* (2018.01)

(52) U.S. Cl.
CPC ........ *H04L 61/2007* (2013.01); *H04M 15/57* (2013.01); *H04M 15/63* (2013.01); *H04W 76/12* (2018.02); *H04W 76/14* (2018.02); *H04W 88/04* (2013.01); *H04L 61/6059* (2013.01); *H04W 76/15* (2018.02); *H04W 92/24* (2013.01)

(58) Field of Classification Search
CPC .. H04W 76/15; H04W 92/24; H04L 12/1407; H04L 45/74; H04L 61/2007; H04L 61/6059
See application file for complete search history.

(56) References Cited

U.S. PATENT DOCUMENTS

| | | | |
|---|---|---|---|
| 2010/0217855 A1* | 8/2010 | Przybysz | H04L 47/805 709/223 |
| 2011/0141886 A1 | 6/2011 | Lee et al. | |
| 2012/0081557 A1* | 4/2012 | Kupinsky | H04L 12/1407 348/207.1 |
| 2012/0215931 A1 | 8/2012 | Touati et al. | |
| 2012/0224677 A1* | 9/2012 | Riley | H04L 12/1407 379/93.01 |
| 2013/0121262 A1 | 5/2013 | Sadiq et al. | |
| 2013/0287012 A1* | 10/2013 | Pragada | H04W 76/22 370/338 |
| 2013/0297812 A1* | 11/2013 | Zhou | H04M 15/66 709/228 |
| 2014/0153391 A1* | 6/2014 | Ludwig | H04W 28/0252 370/230 |
| 2015/0172471 A1* | 6/2015 | Castro Castro | H04L 65/1006 370/329 |
| 2015/0382386 A1* | 12/2015 | Castro Castro | H04L 61/2007 370/329 |
| 2016/0057788 A1 | 2/2016 | Sharma et al. | |
| 2016/0219635 A1 | 7/2016 | Iwai et al. | |
| 2016/0226669 A1* | 8/2016 | Livanos | H04L 12/1407 |
| 2017/0078244 A1 | 3/2017 | Zhang et al. | |
| 2018/0176927 A1* | 6/2018 | Deng | H04W 72/085 |

FOREIGN PATENT DOCUMENTS

| | | |
|---|---|---|
| RU | 2 464 739 C1 | 10/2012 |
| WO | 2012110939 A1 | 8/2012 |
| WO | 2012/147270 A1 | 11/2012 |
| WO | 2015/005900 A1 | 1/2015 |
| WO | 2015180141 A1 | 12/2015 |
| WO | 2017/034511 A1 | 3/2017 |

OTHER PUBLICATIONS

Notice of Reasons for Rejection dated Jun. 12, 2020 issued in Japanese Patent Application No. 2019-523596. (4 pages).
3GPP TSG-RAN WG2 #95bis; Tdoc R2-166726; Kaohsiung, Taiwan, Oct. 10-14, 2016, Ericsson, "Control plane states". (4 pages).
3GPP TSG-RAN WG2 #95bis; Tdoc R2-166727; Kaohsiung, Taiwan, Oct. 10-14, 2016, Ericsson, "Quality of Service for the Relay solution". (3 pages).
Office Action dated Nov. 20, 2019, in Russian Application No. 2019117621/08(033764) (6 pages).
International Search Report and Written Opinion dated Jan. 26, 2018 issued in International Application No. PCT/CN2017/108886 (10 pages).
3GPP TS 23.402 V10.2.0 (Dec. 2010); 3rd Generation Partnership Project; Technical Specification Group Services and System Aspects; Architecture enhancements for non-3GPP accesses (Release 10), (Dec. 2010). (228 pages).
3GPP TS 29.212 V14.2.0 (Dec. 2016); 3rd Generation Partnership Project; Technical Specification Group Core Network and Terminals; Policy and Charging Control (PCC); Reference points (Release 14), (Dec. 2016). (272 pages).
3GPP TS 29.214 V14.1.0 (Sep. 2016); 3rd Generation Partnership Project; Technical Specification Group Core Network and Terminals; Policy and Charging Control over Rx reference point (Release 14), (Sep. 2016). (76 pages).
Ericsson, Radius Support: Technical Product Description, Mar. 22, 2016. (29 pages).

* cited by examiner

SERVICE DIFFERENTIATION FOR DEVICES CONNECTED TO A UE AS A ROUTER

CROSS REFERENCE TO RELATED APPLICATION(S)

This application is a 35 U.S.C. § 371 National Stage of International Patent Application No. PCT/CN2017/108886, filed Nov. 1, 2017, designating the United States and claiming priority to International Patent application no. PCT/CN2016/104944, filed on Nov. 7, 2016. The above identified applications are incorporated by reference.

TECHNICAL FIELD

The present invention relates to methods and arrangements in cellular mobile communication systems, in particular in relation to service differentiation when devices are connected to a user device functioning as a router.

BACKGROUND

As the wireless networks evolve they increasingly become mixed with a multitude of different communication technologies and access technologies. For instance, a user device, e.g. referred to as a User Equipment (UE), with a cellular connection to a cellular base station may have other devices connected to it while the UE provides access to the cellular network and wireless services using for instance WiFi or similar short range communication technologies for these other devices.

Wireless communication is used by a number of different devices, such as for instance mobile phones, smart phones, personal digital assistants, laptops, Personal Computers (PCs), sensors, utility meters, vehicles, security devices, or home appliances. The number of devices are growing in a fast pace and the list is not exhaustive in any way. These different types of devices can connect to an external network, e.g. Internet or some Intranet using a wireless communication technology such as cellular communication protocols, e.g. Second Generation (2G), Third Generation (3G), Fourth Generation (4G), Fifth Generation (5G) and so on: Global System for Mobile communication (GSM), General Packet Radio Service (GPRS), Enhanced Data rates for GSM Evolution (EDGE), Universal Mobile Telecommunications System (UMTS), Long Term Evolution (LTE), New Radio (NR), or short range protocols such as for instance WiFi, Zigbee, Bluetooth, Long Range Radio (LoRa), Near Field Communication (NFC), Radio Frequency Identification (RFID), Internet Protocol version 6 (IPv6) over Low Power Wireless Personal Area Networks (6LoWPAN), and Z-wave directly via an access point or via an intermediate device in turn connected to the external network using a wireless communication protocol, cellular or short range.

When a device is connected via an intermediate device it may be given a local Internet Protocol (IP) address, for instance provided by the intermediate device or a gateway node in the network architecture.

UE as a Mobile Router

A UE as a router, for instance for a Virtual Private Network (VPN), is a mobile data solution that enables several other devices to be attached to the UE and to access networks through this UE. Such UE may also be referred to as a routing behind Mobile Station (MS), UE as router, UE as mobile router, wireless router, IP-router, IP_router. In other words, it enables routing of data packets to addresses of devices that do not belong to the Packet Data network (PDN) Session, i.e. the UE as router, but exist behind it. The destination address for the data packets can be different than the address of the UE as router. The devices attached to the UE as router may be seen as being comprised in a subnet. The subnet for these devices attached to the UE as router is obtained from an Authentication, Authorization and Accounting (AAA) server. The IP addresses of those devices are routable, i.e. public address, and they are independent from the IP address of UE as router which is obtained during a Packet Data Protocol (PDP) Context activation procedure or a PDN connection establishment procedure.

With the term UE is meant a terminal, a mobile phone, a smart phone, a laptop, a PC, a sensor, a manufacturing machine, a vending machine, an Automated Teller Machine (ATM), a pay terminal, e.g. Point of Sale (PoS) terminal, vehicle, boat, aircraft, Internet of Things (IoT) device, home appliance, or any other type of equipment with wireless connectivity feature(s) that operate together with a user or without a user.

A framed route attribute, parameter or information provides routing information to be configured for the user, i.e. the UE as a router, on the Network Access Server (NAS). The framed route information is returned from a Remote Authentication Dial-In User Service (RADIUS) server in an access accept message. The framed route is defined in the Internet Engineering Task Force (IETF) standard RFC2865). The framed route attribute indicates a routing method for the UE as router, and it is only used in the access accept message. The framed route is configured in the profile of a user and comprises at least one route for each UE that is to use the routing behind the UE feature. The terms UE, MS and wireless device are used interchangeably herein.

Before continuing to describe the UE as router, a cellular telecommunications infrastructure network and how it may be built up will be described. In FIG. 1 reference numeral 100 indicates a cellular telecommunications infrastructure network. A first UE 101, such as a terminal, mobile/cellular phone, smart phone, Pocket Digital Assistant (PDA), tablet computer, laptop, personal computer, or any other device capable of wireless communication, e.g. non-user related equipment such as devices in machine-to-machine communication, communicates via a wireless communication link 120 with a radio access device/network node 122, e.g. an eNodeB (eNodeB, eNB), NodeB, Base station, Radio Network Controller (RNC), Base Station Controller (BSC) or similar network infrastructure access device, which in turn communicates with a core network 104 handling charging, authentication, and connection to other communication devices and/or application services such as for instance Internet based services. The core network 104 may for instance be an Evolved Packet Core (EPC) network. The wireless communication link 120 may for example be based on LTE or similar cellular based communications network standard as for instance NR, Wideband Code Division Multiple Access (WCDMA), GPRS, and EDGE. A second UE 103 may be connected to the first UE 101 via a short range wireless communication interface 130. The second UE 103 may be for instance another UE such as a smart phone, PDA, a laptop, a PC, a camera, a temperature sensor, a surveillance device, an Internet of Things device, a home appliance, an external device and so on.

The first UE 101 with reference number 101 may be referred to as a UE acting as a router, an IP router, a UE acting as a mobile router, UE as router, wireless router, a mobile router, IP-router or an IP_router. The second UE 103 may be referred to as a device behind the UE 101, an IP device, wireless device, mobile device or an external device. These terms are used interchangeably herein.

The core communication network 104, or simply core network, further comprises a mobility management node, such as Mobility Management Entity/Serving GPRS Support Node (MME/SGSN) 102, a Serving Gateway (SGW) 106, a PDN Gateway/General Packet Radio Service Gateway Serving Node (PGW/GGSN) 107, a Policy and Charging Rules Function (PCRF) 108, an Application Function (AF) 140, and a radius server 145. The radius server 145 may also be referred to as a radius database. The core network 104 may in turn be connected to an external network 150 such as Internet or an intranet. It should be understood that the different core network nodes may be located in the same hardware. The AF 140 may be in form of a Proxy-Call State Control Function (P-CSCF). The PGW/GGSN refers to a PGW, or a GGSN, or both a PGW and a GGSN, or a combined PGW and GGSN co-located in one node. The MME/SGSN refers to a MME, or a SGSN or both a MME and a SGSN or a combined MME and SGSN co-located in one node.

FIG. 2 illustrates a first UE 101 acting as a mobile router. The UE 101 acting as a mobile router is exemplified to have two second UEs 103 being connected to the first UE 101. The two second UEs 103 are IP_device 1, e.g. a laptop, and IP_device 2, e.g. a mobile phone. The two second UEs 103 are comprised in the framed route of the first UE 101. Note that two second UEs 103 is only an example and that any suitable other number of second UEs 103 is also applicable. An exception from this is FIG. 3 in which UE with reference number 101 is not acting as a mobile router.

As illustrated in FIG. 2, the first UE 101 acting as a mobile Router creates a PDN connection 200 which a PGW/GGSN 107 authorizes using the radius server 145. The radius server 145 authenticates this first UE 101 and includes a framed route attribute in the radius access accept message. The framed route attribute specifies the subnet routing information to be installed in the PGW/GGSN 107 for the first UE 101.

The IP address allocated to the first UE 101, i.e. the UE as a router, is denoted "IP_router". The IP addresses of the second UEs 103 attached to the first UE 101 are within the subset specified in framed route, and these IP addresses are denoted "IP_deviceX" where X is a positive integer, i.e. 1, 2 etc.

When the second UEs 103 attached to the first UE 101 send uplink (UL) traffic 203, they may use the IP address IP_deviceX, which is different from the IP address IP_router. IP_deviceX then indicates the source of the UL traffic. The source of the UL packets is IP_deviceX. The UL traffic may also be referred to as UL packets or UL data packets. When the PGW/GGSN 107 receives a downlink (DL) packet 205 with a destination address matching an address in the framed route, e.g. the address may be IP_deviceX, then the packet is forwarded to the first UE 101 through the associated PDN session, and finally to the second UEs 103 attached to the first UE 101. The destination of the DL packets 205 is IP_deviceX. The DL packet 205 may also be referred to as DL data packets or DL traffic.

The first UE 101 acting as mobile router could be camping on 2G or 3G, or future NR access in 5G as well.

Service Differentiation achieved by dedicated bearer creation FIG. 3 illustrates a dedicated bearer creation triggered by service information from the AF 140. A bearer may be described as a "pipe" or "tunnel" carrying data from one node to another node. A bearer may be a dedicated bearer or a default bearer. A default bearer represents a PDN connection, is created at initial attach or at creation of a PDN connection and exists as long as the UE is connected. A dedicated bearer provides a dedicated tunnel for a specific type of traffic, e.g. voice, video, Voice over IP (VoIP), Voice over LTE (VoLTE) etc. A dedicated bearer exits in addition to a default bearer, and these two bearers are linked to each other.

Note also that FIG. 3 is a simplified flow, and that there may be additional method steps which is also performed by not illustrated herein for the sake of simplicity. Note also that the UE in FIG. 3 is not acting as a router. The network node 122 is exemplified by an eNB in FIG. 3. The AF 140 may be for example a P-CSCF.

As illustrated FIG. 3, the current signaling is as follows, where the steps may be performed in any suitable order than described below:

Step 301

The UE 101 sends an attach request message to the MME/SGSN 102. The MME/SGSN 102 receives the attach request message from the UE 101. A PDN connectivity request is sent together with the attach request message.

Step 302

The MME/SGSN 102 sends a create session request message to the PGW/GGSN 107. The create session request message is sent via the SGW 106. The PGW/GGSN 107 receives the create session request message from the MME/SGSN 102.

Step 303

The PGW/GGSN 107 sends a Credit Control Request-Initial (CCR-I) message to the PCRF 108 over the Gx interface. The message comprises information indicating the Framed-IP=IP_UE. The PCRF 108 receives the CCR-I message from the PGW/GGSN 107. The Gx interface is between the PGW/GGSN 107 and the PCRF 108.

Step 304

The PCRF 108 sends a Credit Control Answer-Initial (CCA-I) message to the PGW/GGSN 107. The PGW/GGSN 107 receives the CCA-I message from the PCRF 108.

Step 305

The PGW/GGSN 107 sends a create session response message to the MME/SGSN 102 via the SGW 106. The message comprises information indicating IP_UE. The MME/SGSN 102 receives the create session response message from the PGW/GGSN 107. The create session response message is a response to the create session request message in step 302.

Step 306

The MME/SGSN 102 sends an attach accept message to the UE 101. An activate default EPS bearer request message comprising information indicating IP_UE is sent together with the attach accept. The message may comprise information which indicates IP_UE. The UE 101 receives the attach accept message from the MME/SGSN 102. The attach Accept message is a response to the attach request message in step 301. An activate default EPS bearer request is sent together with the attach accept message.

Step 307

After steps 301-306 has been performed, the UE 101 starts priority services. The priority services may be described as a special service.

Step 308

The AF 140 sends an AAR-I message to the PCRF 108. The AAR-I message is sent over the Rx interface. The AAR-I message comprises information indicating the priority service and Framed-IP=IP_UE. The Rx interface is located between the PCRF 108 and the AF 140. The PCRF 108 receives the AAR-I message from the AF 140.

Step 309

The PCRF 108 performs Gx-Rx binding based on IP_UE.

The PCRF 108 first establishes the Gx session for a PDN, i.e. IP-Connectivity Access Network (IP-CAN) session, towards the PGW/GGSN 107. Then the PCRF 108 establishes the Rx session for a service towards the AF 140 wherein the service is going to be carried on the PDN. The PCRF 108 needs to bind the Rx session, i.e. the service, to the Gx session, e.g. PDN based on IP address and possibly also based on other parameters.

In a network with multiple PCRF's 108, it has to be ensured that all Diameter sessions established over the Gx, Rx and S9 reference points for a specific IP-CAN session use the same PCRF instance. This session correlation capability may be referred to as "session binding" or "PCRF binding". For example, a session created over the Gx interface for LTE UEs may be routed to a specific PCRF based on the subscriber identifier, e.g. International Mobile Subscriber Identity (IMSI). When another session is created over the Rx interface, this session is identified by the assigned IP address. To ensure that session requests are routed to the correct PCRF, the relationship between the subscriber identifier, the assigned IP address and the chosen PCRF instance has to be maintained for the duration of the IP-CAN session. Using other words, binding includes an association of AF session information to one IP-CAN session.

Step 310

The PCRF 108 sends a Re-Auth-Request (RAR) message to the PGW/GGSN 107. The message is sent over the Gx interface. The RAR message comprises dynamic Policy Control and Charging (PCC) for the priority service.

Step 311

A dedicated bearer with a Guaranteed Bit Rate (GBR) for the priority service is created.

Summarizing FIG. 3, the AF 140 requests resource reservation, i.e. step 308, for a special service, i.e. priority service in the flow, based on a UE request, i.e. step 301;

Step 309: The PCRF 108 first finds the corresponding Gx session based on the UE IP address.

Step 310: The PCRF 108 further sends the request to the PGW/GGSN 107 over Gx.

Step 311: The PGW/GGSN 107 initiates dedicated bearer creation including a specific bearer Quality of Service (QoS) in the form of a GBR in order to fulfill the service differentiation.

The differentiation refers to service differentiation for one UE and for services such as e.g. IP Multimedia Subsystem (IMS) service, Session Initiation Protocol (SIP) signaling, voice media, video media. In other words, for service that needs different quality of service.

There is a need from the market to provide high priority data service for emergency service organizations and enterprise customers where a first UE 101 acts as the Wireless/LTE router that various second UEs 103 connected to with WiFi or other similar short range radio technologies.

The above means that emergency service organization or enterprise customers including the services initiated by the second UEs 103 attached to the first UE 101, i.e. the mobile router, need to use the dedicated bearer with higher priority data service in cases such as emergency or congestion scenarios compared to data services in non-emergency or non-congestion scenarios. Data in non-emergency and non-congestions scenarios have lower priority compared to the emergency and congestion scenarios. For example, in a mining site there is surveillance device connected to an LTE router and in the event of emergency, it will turn on its camera and stream live video to an emergency center. It requires a dedicated bearer with higher QoS profile to be established in order to prioritize the streaming live video in the network.

With the current PCC architecture, it may not be possible to trigger a dedicated bearer if the second UEs 103 attached to a first UE 101 as router initiates the priority services and the address IP_deviceX is used in the service request from the AF 140, e.g. P-CSCF. Below is an explanation of this.

When a first UE 101 acts as mobile router, if the second UEs 103 attached to the first UE 101 initiates a priority service using the source address IP_deviceX, the priority service may not go through at all because the PCRF 108 cannot find the corresponding Gx session. FIG. 4 illustrates an example of such scenario. FIG. 4 shows a problem with a PCC solution, i.e. that there is no dedicated bearer creation for services started from second UEs 103 attached to a first UE 101. The network node 122 is exemplified with an eNB in FIG. 4.

In FIG. 4, a first UE 101 acts as a mobile router, and may also be referred to as an IP router. The first UE 101 acting as a mobile router is exemplified with two second UEs 103 being connected to the first UE 101. The two second UEs 103 are IP_device 1, e.g. a laptop, and IP_device 2, e.g. a mobile phone. The two second UEs 103 are comprised in the framed route of the first UE 101. Note that two second UEs 103 is only an example, and that any suitable other number of second UEs 103 is also applicable. Note also that FIG. 4 is a simplified flow, and that there may be additional method steps which is also performed by not illustrated herein for the sake of simplicity. FIG. 4 is different from FIG. 3 in that the first UE 101 acts as a router in FIG. 4, i.e. it has second UEs 103 connected to it, which is located behind it. In FIG. 3, there is only one UE and it is not acting as a router.

The method in FIG. 4 comprises at least some of the following steps, which steps may be performed in any suitable order than described below:

Step 401

This step corresponds to step 301 in FIG. 3. The first UE 101 sends an attach request message to the MME/SGSN 102. The MME/SGSN 102 receives the attach request message from the first UE 101. A PDN connectivity request is sent together with the attach request.

Step 402

This step corresponds to step 302 in FIG. 3. The MME/SGSN 102 sends a create session request message to the PGW/GGSN 107. The create session request message is sent via the SGW 106. The PGW/GGSN 107 receives the create session request message from the MME/SGSN 102.

Step 403

The PGW/GGSN 107 sends a CCR-I message to the PCRF 108 over the Gx interface. The message comprises information indicating the Framed-IP=IP_Router. The PCRF 108 receives the CCR-I message from the PGW/GGSN 107. The Gx interface is between the PGW/GGSN 107 and the PCRF 108.

Step 404

The PCRF 108 sends a CCA-I message to the PGW/GGSN 107. The PGW/GGSN 107 receives the CCA-I message from the PCRF 108.

Step 405

The PGW/GGSN 107 sends a create session response message to the MME/SGSN 102. The message comprises information indicating IP_router. The MME/SGSN 102 receives the create session response message from the PGW/GGSN 107. The create session response message is a response to the create session request message in step 402.

Step 406

The MME/SGSN 102 sends an attach accept message to the first UE 101. An activate default EPS bearer request comprising information indicating IP_router may be sent together with the attach accept. The first UE 101 receives the attach accept message from the MME/SGSN 102. The attach accept message is a response to the attach request message in step 301.

Step 407

After at least some of the steps 401-406 has been performed, the first UE 101 starts priority services. Priority services may be described as a special service. The source of the priority service is IP_deviceX.

Step 408

The AF 140 sends an AAR-I message to the PCRF 108. The AAR-I message is sent over the Rx interface. The AAR-I message comprises information indicating the priority service and Framed-IP=IP_deviceX. The PCRF 108 receives the AAR-I message from the AF 140. The PCRF 108 will not find the Gx session based on the IP_deviceX because the Gx session is associated with IP_router. So, the PCRF 108 is not able to perform any Rx-Gx binding.

SUMMARY

It is an object to obviate at least some of the above disadvantages and provide improved node(s) and method(s) for wireless telecommunication networks.

The embodiments herein relate to a method in a PCRF for achieving service differentiation, a corresponding PCRF, a method in a PGW for achieving service differentiation and a corresponding PGW.

The method in the PCRF for achieving service differentiation for a second UE attached to a first UE acting as a mobile router. The method comprises receiving at the PCRF from a further node a request for establishing a PDN connection for the first UE, the request comprising routing information of the first UE; receiving at the PCRF from an AF, a request for resource reservation for a service based on a request from a second UE, the request comprising an IP address of the second UE; and correlating, at the PCRF, the routing information of the first UE with the IP address of the second UE.

Embodiments herein relate also to a PCRF for achieving service differentiation for a second UE attached to a first UE acting as a mobile router. The PCRF being configured to receive from a further node a request for establishing a PDN connection for a first UE, the request comprising routing information of the first UE; receive from an AF, a request for resource reservation for a service based on a request from a second UE, the request comprising an IP address of the second UE; and to correlate the routing information of the first UE with the IP address of the second UE.

Still further, the embodiments herein relate to a method in a PGW/GGSN for achieving service differentiation for a second UE attached to a first UE acting as mobile router, the method comprising receiving a resource reservation request from a PCRF for a service requested from an AF, the resource reservation request comprising correlated routing information of a first UE with the IP address of a second UE; and creating or updating a dedicated bearer for the service requested from the AF.

The embodiments herein relate also to a PGW/GGSN for achieving service differentiation for a second UE attached to a first UE acting as mobile router. The PGW/GGSN is configured to receive a resource reservation request from a PCRF for a service requested from an AF, the resource reservation request comprising correlated routing information of a first UE with the IP address of a second UE; and to create or update a dedicated bearer for the service requested from the AF.

Embodiments herein afford many advantages, of which a non-exhaustive list of examples follows:

An advantage of the embodiments herein is that they make it possible to achieve service differentiation by means of dedicated bearer creation for services initiated from second UEs attached to a first UE as router. This has the advantages of providing priority service and/or emergency service.

The embodiments herein are not limited to the features and advantages mentioned above. A person skilled in the art will recognize additional features and advantages upon reading the following detailed description.

BRIEF DESCRIPTION OF THE DRAWINGS

In the following the invention will be described in a non-limiting way and in more detail with reference to exemplary embodiments illustrated in the enclosed drawings, in which:

FIG. 8 is an infrastructure node and FIG. 9 is a UE/terminal/device node.

The drawings are not necessarily to scale and the dimensions of certain features may have been exaggerated for the sake of clarity. Emphasis is instead placed upon illustrating the principle of the embodiments herein.

DETAILED DESCRIPTION

Figure 1:
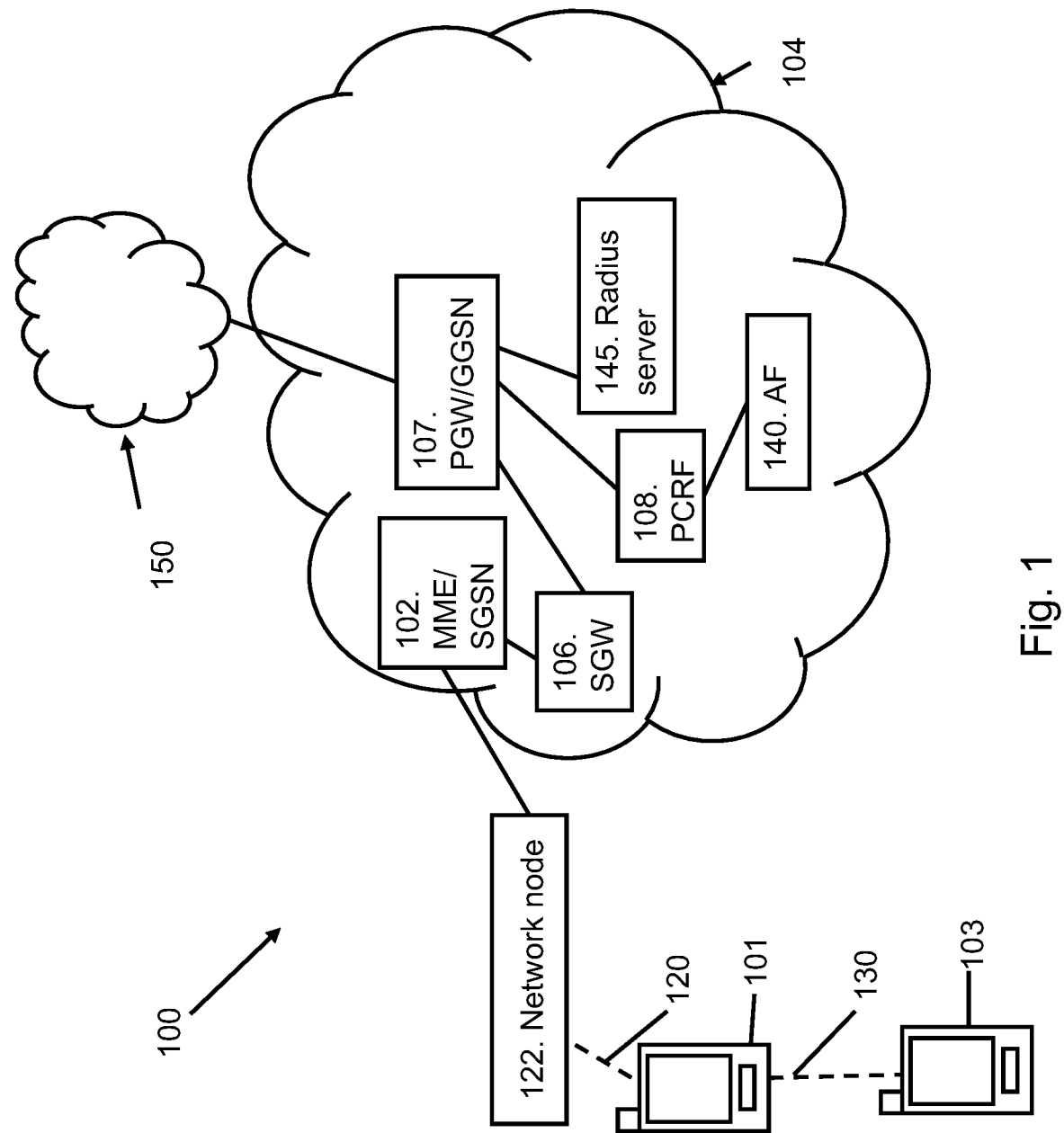
FIG. 1 is a schematic block diagram illustrating an example network.
Figure 2:
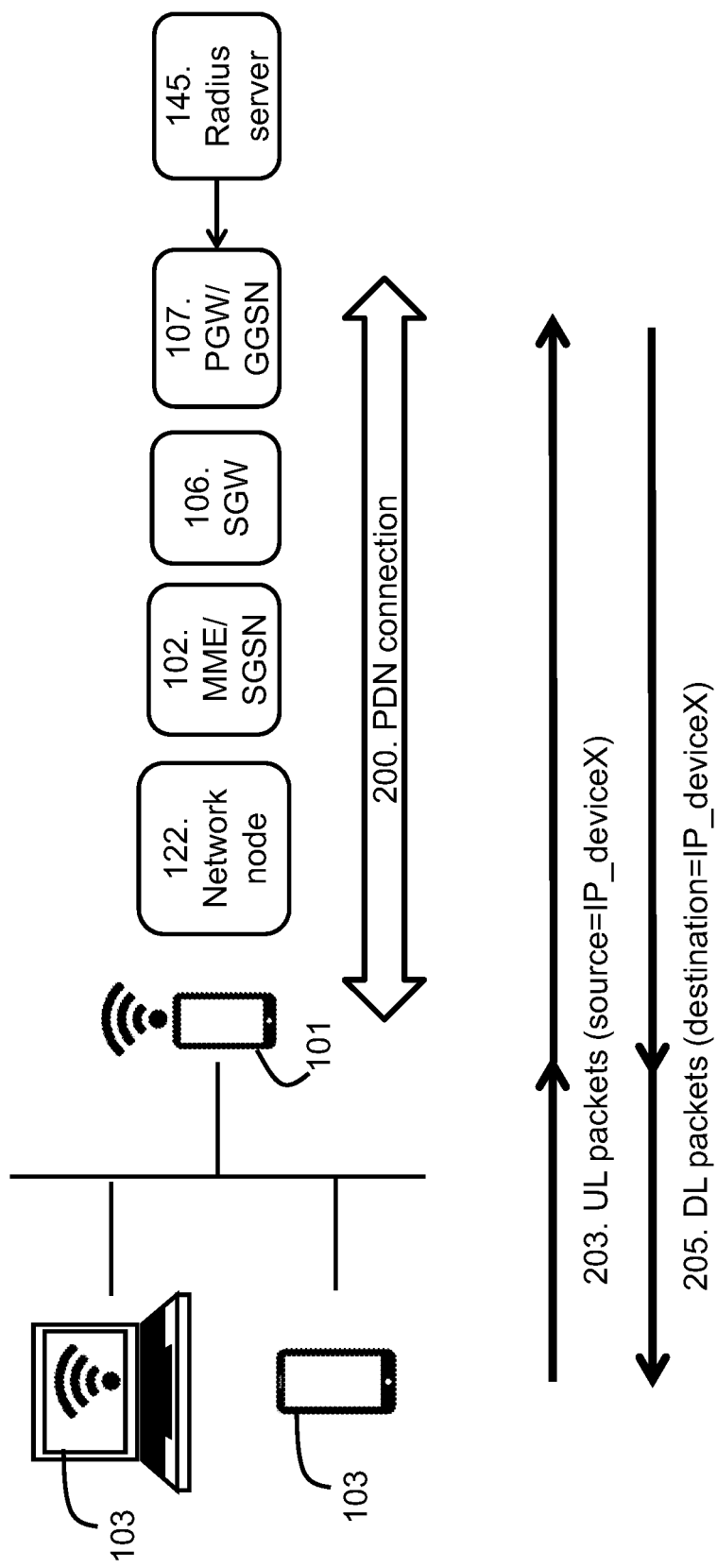
FIG. 2 is a schematic block diagram illustrating an exemplary signalling flow.

With reference to the exemplary cellular telecommunications infrastructure network in FIG. 1, the following solution can be considered:

The PCRF 108 does the correlation of IP route and IP_deviceX:

(1) The PGW/GGSN 107 also provides the framed route or the delegated IPv6 prefix for IPv6 to the PCRF 108, in addition to the frame IP address or the framed IPv6 prefix during the Gx session establishment. Another option is that the PCRF 108 gets the framed route or delegated IPv6 prefix for IPv6 from the Subscription Profile Repository (SPR) or the User Data Repository (UDR).

(2) The PCRF 108 will also check the framed route or delegated IPv6 prefix to do the correlation of IP_router and IP_deviceX in the Gx-Rx session binding.

The embodiments herein make it possible to achieve service differentiation by means of dedicated bearer creation for services initiated from second UEs 103 attached to a first UE 101 as router. This has the advantages of providing priority service and/or emergency service.

Example will now be described in more detail with reference to FIG. 5. The embodiments herein may comprise at least one of the steps below. The order of the steps does not need to be the order in which the steps are described below. Instead, any suitable order recognized by the skilled person is possible.

Service Differentiation Achieved by Dedicated Bearer Creation

Figure 4:
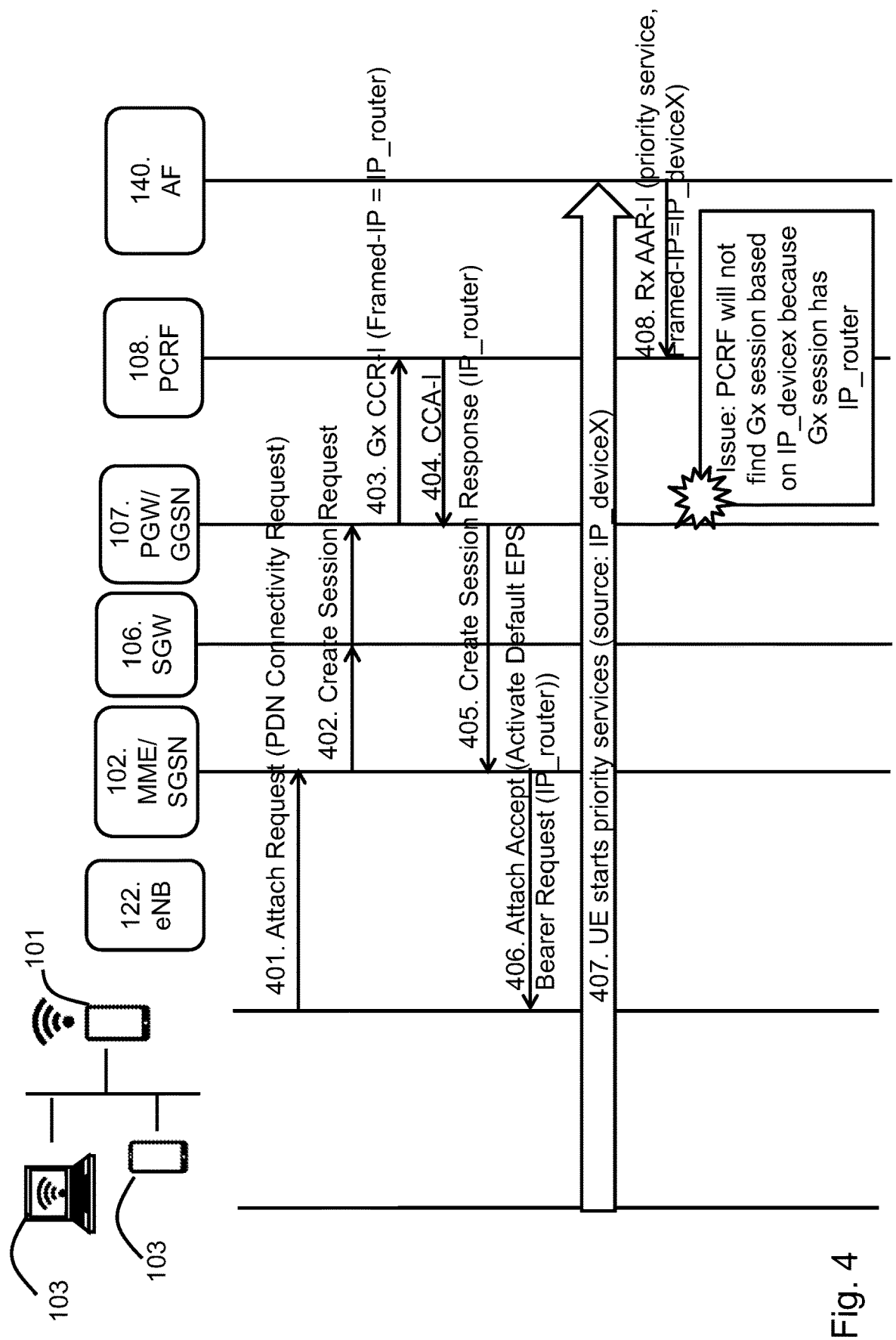
FIG. 4 is a schematic block diagram illustrating an exemplary signalling flow.
Figure 5:
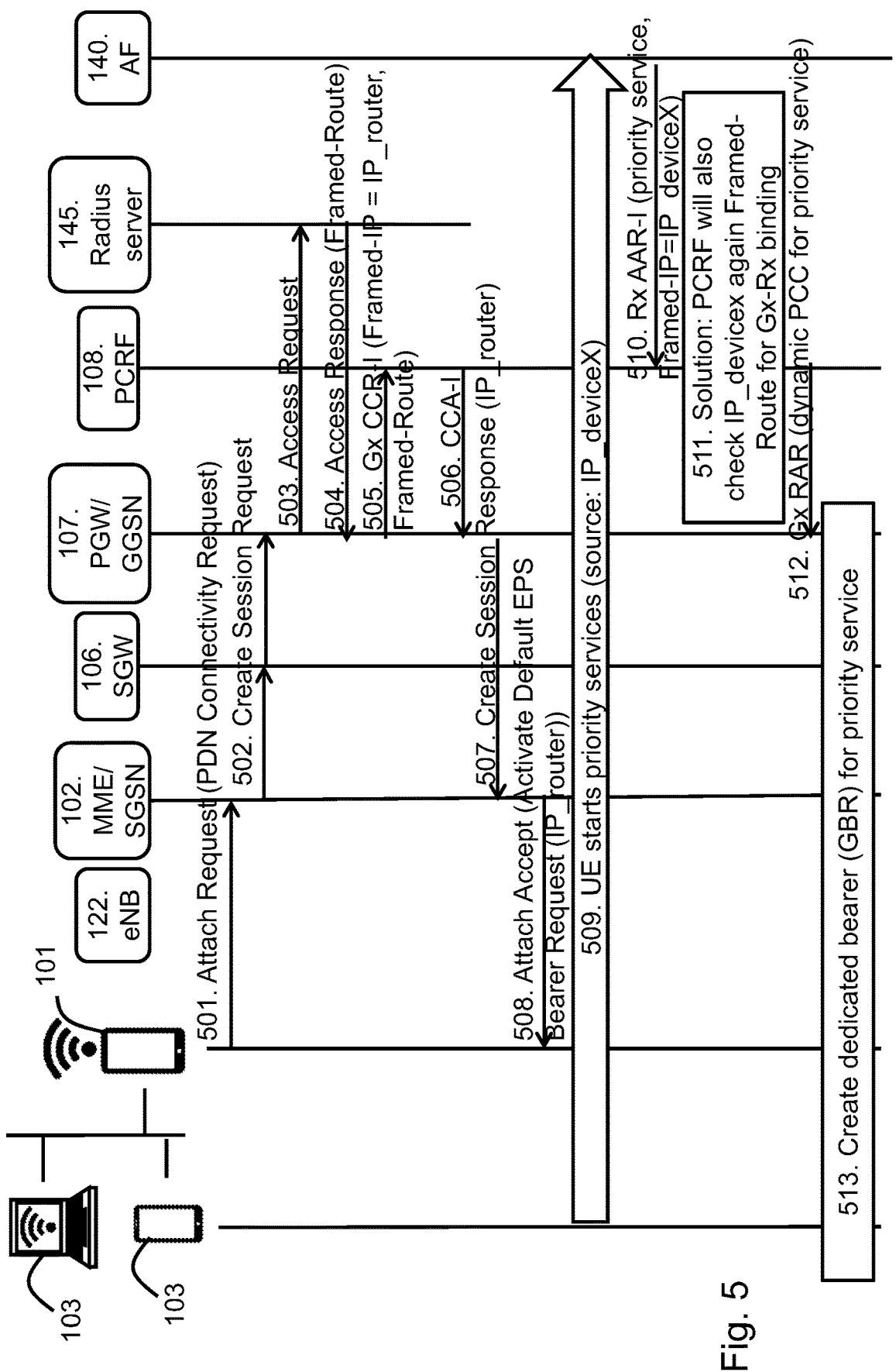
FIG. 5 is a schematic block diagram illustrating an exemplary signalling flow.

Before starting to describe FIG. 5, the current signaling as illustrated in FIG. 4 and as described earlier will be summarized. The current signaling illustrated in FIG. 4 is as follows:

- An AF 140, e.g. P-CSCF, requests resource reservation for a special service, i.e. priority service in the flow, based on a UE request.
- The PCRF 108 first finds the corresponding Gx session based on the UE IP address.
- The PCRF 108 further sends the request to the PGW/GGSN 107 over the Gx interface.
- The PGW/GGSN 107 initiates the dedicated bearer creation including a specific bearer QoS in order to fulfill the service differentiation.

As described earlier, an issue with this current signaling is that the PCRF 108 will not find the Gx session based on IP_deviceX because the Gx session has IP_router as its framed-IP.

One possible solution for handling this will be described below:

(1) The PGW/GGSN 107 also provides the framed route to the PCRF 108 at IP-CAN session establishment.
(2) The PCRF 108 correlates the IP address received from the AF 140 and the framed route received from the PGW/GGSN 107 to perform Gx-Rx session binding.

With this solution, service differentiation may be achieved using a GBR bearer when the second UEs 103 attached to a first UE 101 as a mobile router starts services such as priority services.

An exemplary signaling flow for the solution briefly described above will now be described in more detail with reference to FIG. 5.

In FIG. 5, a first UE 101 acts as a mobile router, and may also be referred to as an IP router or wireless router. In this example, two second UEs 103 are connected to the first UE 101 acting as a mobile router. The two second UEs 103 are IP_device 1, e.g. a laptop, and IP_device 2, e.g. a mobile phone. The two second UEs 103 are comprised in the framed route of the first UE 101. Note that two second UEs 103 is only an example, and that any suitable other number of second UEs 103 is also applicable. Note also that FIG. 5 is a simplified flow, and that there may be additional method steps which are also performed by not illustrated herein for the sake of simplicity. The network node 122 is exemplified with an eNB in FIG. 5.

The method illustrated in FIG. 5 comprises at least one of the following steps, which steps may be performed in any suitable order than described below:

Step 501

Figure 3:
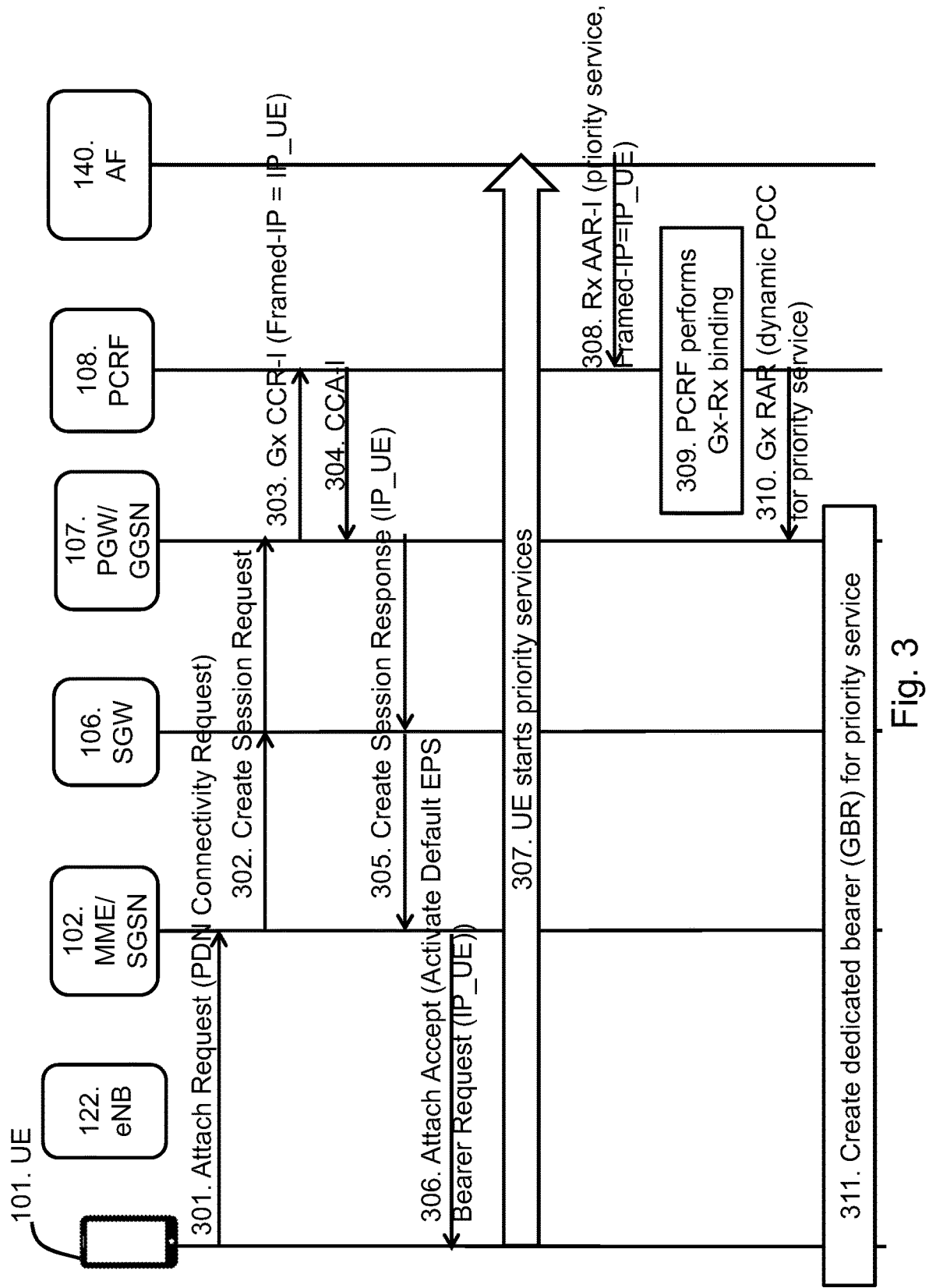
FIG. 3 is a schematic block diagram illustrating an exemplary signalling flow.

This step corresponds to step 301 in FIG. 3 and step 401 in FIG. 4. The first UE 101 sends an attach request message to the MME/SGSN 102. The MME/SGSN 102 receives the attach request message from the first UE 101. A PDN connectivity request is sent together with the attach request.

Step 502

This step corresponds to step 302 in FIG. 3 and step 402 in FIG. 4. The MME/SGSN 102 sends a create session request message to the PGW/GGSN 107. The create session request message is sent via the SGW 106. The PGW/GGSN 107 receives the create session request message from the MME/SGSN 102.

Step 503

The PGW/GGSN 107 sends an access request message to the radius server 145. The access request may be referred to as a radius access request. The radius server 145 receives the access request message from the PGW/GGSN 107.

Step 504

The radius server 145 sends an access response message to the PGW/GGSN 107. The access response message comprises a framed route, i.e. information indicating a framed route. The information indicating the framed route may also be referred to as framed route information, framed route data, framed route parameter, framed route attribute etc. The access response message is a response to the access request message in step 503. The PGW/GGSN 107 receives the access response message from the radius server 145.

Step 505

The PGW/GGSN 107 sends a CCR-I message over the Gx interface to the PCRF 108. The CCR-I message comprises information indicating the Framed-IP=IP_router and the framed route. The PCRF 108 receives the CCR-I message from the PGW/GGSN 107.

Step 506

The PCRF 108 sends a CCA-I message to the PGW/GGSN 107. The PGW/GGSN 107 receives the CCA-I message from the PCRF 108.

Step 507

The PGS/GGSN 107 sends a create session response message to the MME/SGSN 102. The create session response message comprises information indicating the IP_router. The MME/SGSN 102 receives the create session response message from the PGW/GGSN 107. The create session response message is a response to the create session request in step 502.

Step 508

The MME/SGSN 102 sends an attach accept message to the first UE 101. The attach accept message comprises an activate default EPS bearer request with information indicating the IP_router. The first UE 101 receives the attach accept message from the MME/SGSN 102. The attach accept message is a response to the attach request message in step 501.

Step 509

At least one of the second UEs 103 starts priority services where the source is indicated to be IP_deviceX.

Step 510

The AF 140 sends an AAR-I message over the Rx interface to the PCRF 108. The AAR-I message comprises information indicating the priority service and Framed-IP=IP_deviceX. The PCRF 108 receives the AAR-I message from the AF 140.

Step 511

The PCRF 108 checks the IP_deviceX again for the framed route for the Gx-Rx binding.

Step 512

The PCRF 108 sends a RAR message over the Gx interface to the PGW/GGSN 107. The RAR message comprises information indicating the dynamic PCC for the priority service. The PGW/GGSN 107 receives the RAR message from the PCRF 108.

Step 513

A dedicated bearer with GBR is created for the priority service.

FIG. 5 may also described as follows:

Step 501: The first UE 101 acting as a mobile router sends an attach request message, e.g. a PDN connectivity request, to the MME/SGSN 102, via the eNB 122

Step 502: The MME/SGSN 102 in turn sends a create session request message to the PGW/GGSN 107 via the SGW 106.

Step 503: The PGW/GGSN 107 in turn sends a radius access request message to the radius server 145.

Step 504: The radius server 145 responds with an access response message to the PGW/GGSN 107 comprising a framed route element.

Step 505: The PGW/GGSN 107 in turn sends to the PCRF 108 a Gx CCR_I message with framed-IP=IP_router and framed route elements.

Step 506: The PCRF 108 responds to the PGW/GGSN 107 with a CCA_I message.

Step 507: The PGW/GGSN 107 sends a create session response message with an IP_router element to the MME/SGSN 102 via the SGW 106.

Step 508: The MME/SGSN 102 sends an attach accept message to the first UE 101 with an activate default EPS bearer request. The activate default EPS bearer request comprises an IP_router element.

Step 509: The first UE 101 starts priority services, for attached second UE(s) 103, e.g. IP_deviceX, with source: IP_deviceX, towards the AF 140. The AF 140 may be in the form of a P-CSCF.

Step 510: The AF 140, here in form of a P-CSCF, responds with an Rx: AAR-I message to the PCRF 108 with priority service and framed_IP=IP_deviceX elements.

Step 511: PCRF 108 will also check IP_deviceX against framed route for Gx-Rx binding.

Step 512: The PCRF 108 sends a Gx RAR message to the PGW/GGSN 107 with dynamic PCC for a priority service element.

Step 513: A dedicated bearer with a GBR is created for the priority service.

The PCRF 108 may correlate/map the routing information of the first UE 101 with the IP address of the second UE 103. This may be done for instance in a look-up table or according to an algorithm.

The framed route attribute provides routing information to be configured for the user on the NAS, i.e. for the first UE 101 on the NAS. The framed route information may be returned from the radius server 145 in the access accept message. See step 508.

For instance, a GBR bearer is preferred for VoLTE. GBR is preferred also in case of emergency services.

As illustrated in FIG. 5, the solution is,

At PDN connection setup, the PGW/GGSN 107 also provides the framed route obtained from the radius server 145 to the PCRF 108.

When the AF 140, e.g. the P-CSCF, requests resource reservation for a specific service, the PCRF 108 will also check the framed route to perform Gx-Rx session binding.

Another alternative is that the PCRF 108 can get the framed route from the SPR/UDR (not shown in FIG. 5).

Figure 6:
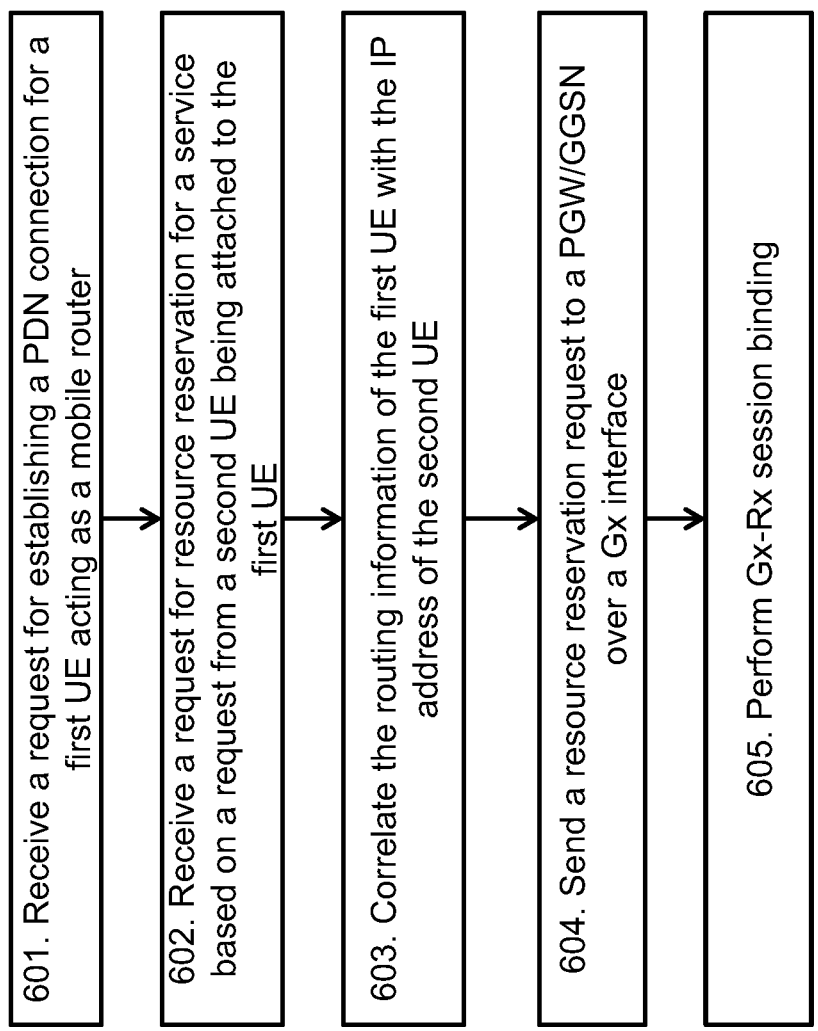
FIG. 6 is a flow chart illustrating a method performed by the PCRF.

The method described above will now be described seen from the perspective of the PCRF 108. FIG. 6 is a flowchart describing the present method performed by the PCRF 108 for achieving service differentiation for a second UE 103 attached to a first UE 101 acting as a mobile router. The method comprises at least one of the following steps in the PCRF 108, which steps may be performed in any suitable order than described below:

Step 601

This step corresponds to step 505 in FIG. 5. The PCRF 108 receives, from a further node 107, a request for establishing a PDN connection for the first UE 101 acting as a mobile router. The request comprises routing information of the first UE 101.

The routing information of the first UE 101 may comprise routing information to be configured for a user on a NAS, i.e. for the first UE 101 on a NAS.

The routing information of the first UE 101 may comprise a framed route or a delegated IPv6 prefix or a framed IPv6 route. The framed route may be received from a radius server 145.

The further node 107 may also be referred to as a second node 107 and the PCRF 108 may be referred to as a first node 108.

The further node 107 may be a PGW/GGSN 107. The further node 107 may be a SPR/UDR.

Step 602

This step corresponds to step 510 in FIG. 5. The PCRF 108 receives, from an AF 140, a request for resource reservation for a service based on a request from the second UE 103 being attached to the first UE 101. The request comprises an IP address of the second UE 103.

The resource reservation request may be a re-authorization request to the PGW/GGSN 107 to establish or update a dedicated bearer for a service requested from the AF 140. Establishing may be the same as creating.

The resources are resources in EPS, i.e. the dedicated resource matching the QoS requirement of the service. The dedicated resource may be a dedicated bearer in EPS.

Step 603

This step corresponds to step 511 in FIG. 5. The PCRF 108 correlates the routing information of the first UE 101 with the IP address of the second UE 103. The correlating may also be referred to as associating, relating, linking, connecting etc.

The correlating may further comprise to obtain a Gx session corresponding to the routing information of the first UE 101. The obtaining of the Gx session may also be referred to as finding a Gx session.

The correlating may further comprise to indicate the IP address of the second UE 103 in the routing information of the first UE 101. The indicating of the IP address may also be referred to as specifying or adding the IP address.

The correlation may be handled by the PCRF 108 at PDN session establishment.

The routing information may comprise an IP address and a framed route of the first UE 101, and the correlating may comprise correlating the framed route of the first UE 101 with the IP address of the second UE 103.

Step 604

This step corresponds to step 511 in FIG. 5. The PCRF 108 may perform Gx-Rx session binding.

Step 605

This step corresponds to step 512 in FIG. 5. The PCRF 108 may send a resource reservation request to a PGW/GGSN 107 over a Gx interface. The resource reservation request may comprise the correlation of the routing information of the first UE 101 with the IP address of the second UE 103.

In one example, the resource reservation request comprises the routing information with the IP address of the second UE 103.

The resource reservation request may be a re-authorization request to the PGW/GGSN 107 for a service requested from the AF 140, or it may be a re-authorization request to the PGW/GGSN 107 to establish a dedicated bearer for a service requested from the AF 1540.

To perform the method steps shown in FIG. 6 for achieving service differentiation for a second UE 103 attached to a first UE 101 acting as a mobile router, the PCRF 108 is configured to receive, from a further node 107, a request for establishing a PDN connection for a first UE 101 acting as a mobile router. The request comprises routing information of the first UE 101. The further node may be a PGW/GGSN 107. The further node may be a SPR/UDR.

The PCRF 108 is configured to receive, from an AF 140, a request for resource reservation for a service based on a request from a second UE 103. The second UE 103 is attached to the first UE 101. The request comprises an IP address of the second UE 103.

The PCRF 108 is configured to correlate the routing information of the first UE 101 with the IP address of the second UE 103.

The routing information may comprise an IP address and a framed route of the first UE 101, and the PCRF 108 may be configured to correlate the framed route of the first UE 101 with the IP address of the second UE 103.

The PCRF 108 may be further configured to send a resource reservation request to a PGW/GGSN 107 over a Gx interface. The resource reservation request may comprise the correlation of the routing information of the first UE 101 with the IP address of the second UE 103. In one example, the resource reservation request comprises the routing information of the second UE 103.

The resource reservation request may be a re-authorization request to a PGW/GGSN 107 to establish a dedicated bearer for a service requested from the AF 140.

The PCRF 108 may be further configured to obtain a Gx session corresponding to the routing information of the first UE 101 for correlating the routing information of the first UE 101 with the IP address of the second UE 103. The obtaining of the Gx session may also be referred to as finding the Gx session.

The PCRF 108 may be further configured to indicate the IP address of the second UE 103 in the routing information of the first UE 101 for correlating the routing information of the first UE 101 with the IP address of the second UE 103. The indication of the IP address may also be referred to as specifying or adding the IP address.

The PCRF may be further configured to send a resource reservation request to the PGW/GGSN 107 over the Gx interface. The request may comprise the IP address of the second UE 103.

The PCRF 108 may be further configured to perform Gx-Rx session binding.

The routing information of the first UE 101 may comprise routing information to be configured for a user on a NAS, i.e. for a first UE 101 on a NAS.

The routing information of the first UE 101 may comprise a framed route or a delegated IPv6 prefix or a framed IPv6 route. The framed route or the framed IPv6 route may be received from a radius server 145.

Figure 7:
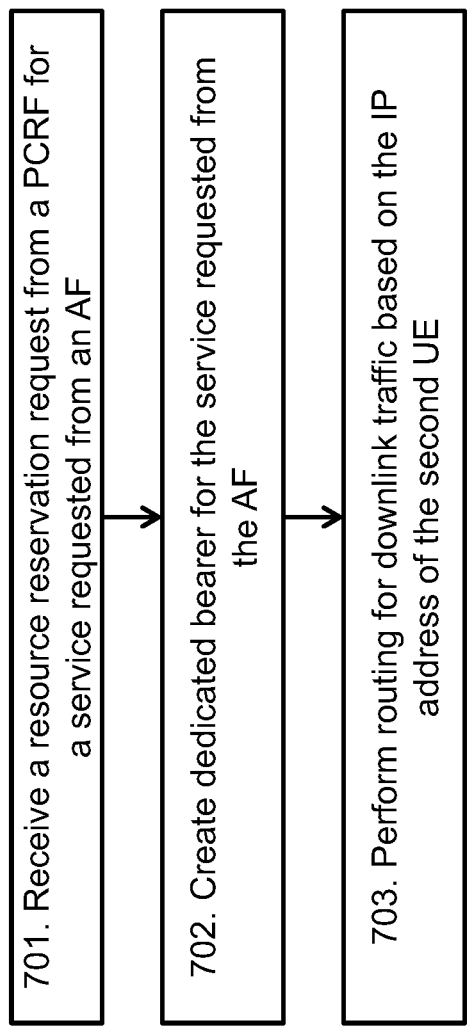
FIG. 7 is a flow chart illustrating a method performed by the PGW/GGSN.

The method described above will now be described seen from the perspective of the PGW/GGSN 107. FIG. 7 is a flowchart describing the present method performed by the PGW/GGSN 107 for achieving service differentiation for a second UE 102 attached to a first UE 101 acting as mobile router. The method comprises at least one of the following steps in the PGW/GGSN 107, which steps may be performed in any suitable order than described below:

Step 701

This step corresponds to step 512 in FIG. 5. The PGW/GGSN 107 receives a resource reservation request from a PCRF 108 for a service requested from an AF 140. The resource reservation request comprises correlated routing information of a first UE 101 which is acting as a mobile router. The routing information comprises an IP address of a second UE 103. The second UE 103 is attached to the first UE 101.

The resource reservation request may be a re-authorization request to the PGW/GGSN 107 for a service requested from the AF 140. The resource reservation request may be a re-authorization request to the PGW/GGSN 107 to establish or update a dedicated bearer for a service requested from the AF 140. Establishing may be the same as creating.

The resource reservation request may be received from the PCRF 108 over a Gx interface.

The correlated routing information may further comprise information indicating the IP address of the second UE 103 in the routing information of the first UE 101. The indicating of the IP address may also be referred to as specifying or adding the IP address.

The routing information of the second UE 103 may comprise routing information to be configured for a user on a NAS, i.e. for a first UE 101 on a NAS. The routing information of the first UE 101 may comprise routing information to be configured for a user on a NAS, i.e. a first UE 101 on a NAS.

The routing information of the first UE 101 may comprise a framed route or a framed IPv6 route or a delegated IPv6 prefix. The framed route or the framed IPv6 route or the delegated IPv6 prefix may be received from a radius server 145.

In one example, the resource reservation request may comprise routing information of the first UE 101 which is acting as a mobile router or the routing information of the second UE 103 attached to the first UE 101.

Step 702

This step corresponds to step 513 in FIG. 5. The PGW/GGSN 107 creates or updates a dedicated bearer for the service requested from the AF 140.

Step 703

This step corresponds to step 513 in FIG. 5. The PGW/GGSN 107 may perform routing for downlink traffic based on the IP address of the second UE 103. The routing may be further based on a port of the second UE 103.

Figure 8:
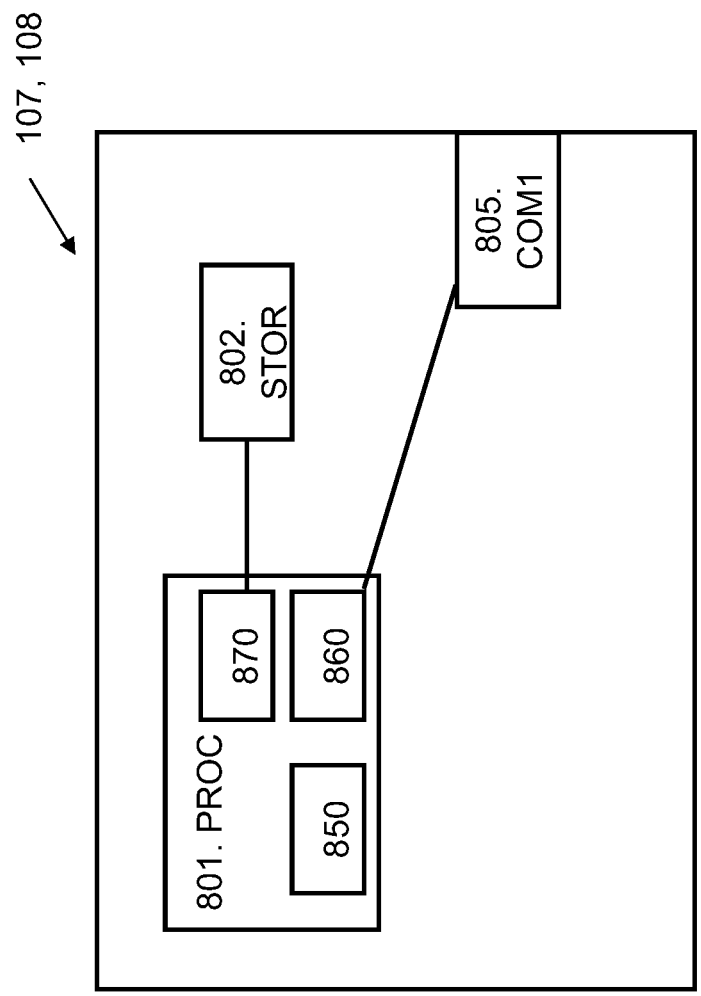
FIGS. 8, 9 are schematic block diagrams illustrating exemplary devices where

To perform the method steps shown in FIG. 8 for achieving service differentiation, the PGW/GGSN 107 is configured to receive a resource reservation request from a PCRF 108 for a service requested from an AF 140. The resource reservation request comprises correlated routing information of a first UE 101 which is acting as a mobile router, with an IP address of a second UE 103. The second UE 103 is attached to the first UE 101. The resource reservation request may be a re-authorization request to the PGW/GGSN 107 to establish a dedicated bearer for a service requested from the AF 140.

The PGW/GGSN 107 may be configured to receive the resource reservation request from the PCRF 108 over a Gx interface.

The correlated routing information further comprises an indication of the IP address of the second UE 103 in the routing information of the first UE 101. The indication of the IP address may also be referred to as a specification or addition of the IP address.

The routing information of the first UE 101 may comprise routing information to be configured for a user on a NAS, i.e. for the first UE 101 on a NAS.

The routing information of the first UE 101 may comprise a framed route or a framed IPv6 route or a delegated IPv6 prefix. The framed route or the framed IPv6 route or the delegated IPv6 prefix may be received from a radius server 145.

The PGW/GGSN 107 is configured to create a dedicated bearer for the service requested from the AF 140.

The PGW/GGSN 107 may be further configured to perform routing for downlink traffic based on the IP address of the second UE 103.

The core network nodes, e.g. the PCRF 108 or the PGW/GGSN 107, comprise as is shown in FIG. 8, at least one processing unit (PROC) 801, and optionally one or more computer readable memory unit (STOR) 802 connected to the processing unit 801. Furthermore, the node also comprises a data communications interface (COM1) 805 for communicating with other core network nodes and the UE 101 via the network node 122. The network node 122 may be for example an eNodeB or RNC or BSC. The processing unit 801 is arranged to receive and transmit control and/or data packets using the communications interface 805. The processing unit 801 is arranged to control data flow and operations according to the embodiments herein within the PCRF 108 between the memory 802 and the communication interface 805, and within the processing unit 801 itself depending on functionality operated. The communication interface 805 may comprise for instance an Ethernet interface or an Asynchronous Transfer Mode (ATM) interface. The processing unit 801 may comprise for instance a processor, a microprocessor, an application specific integrated circuit (ASIC), a digital signal processor (DSP), or a field programmable gate array (FPGA). The memory unit 802 may comprise any suitable volatile and/or non-volatile computer readable storage, e.g. memory in a single unit or as a combination of units. The memory 802 may comprise for instance a solid state drive, e.g. SSD, a random access memory (RAM) of any type, a hard disk (HD), and so on. In case the processing unit 801 is arranged to operate instructions sets, such as the case of the processing unit 801 being for instance a microprocessor or DSP, the processing unit 801 may then be arranged to operate instruction sets stored as software in the computer readable memory unit.

The processing unit 801 of the core network node may comprise a communication control module 850, an address handling module 860 and a transmission module 870 for transmitting acquired and determined parameters to core network nodes, e.g. the SGW 106 and/or PGW/GGSN 107, a network access interface node, e.g. eNodeB/RNC/BSC 122, and/or a UE 101, 103 or a combination of these.

To perform the method shown in FIG. 6, the PCRF 108 may comprise an arrangement as shown in FIG. 8. To perform the method shown in FIG. 7, the PGW/GGSN 107 may comprise an arrangement as shown in FIG. 8. Thus, core network node illustrated in FIG. 8 may be for example a PCRF 108 or a PGW/GGSN 107.

Figure 9:
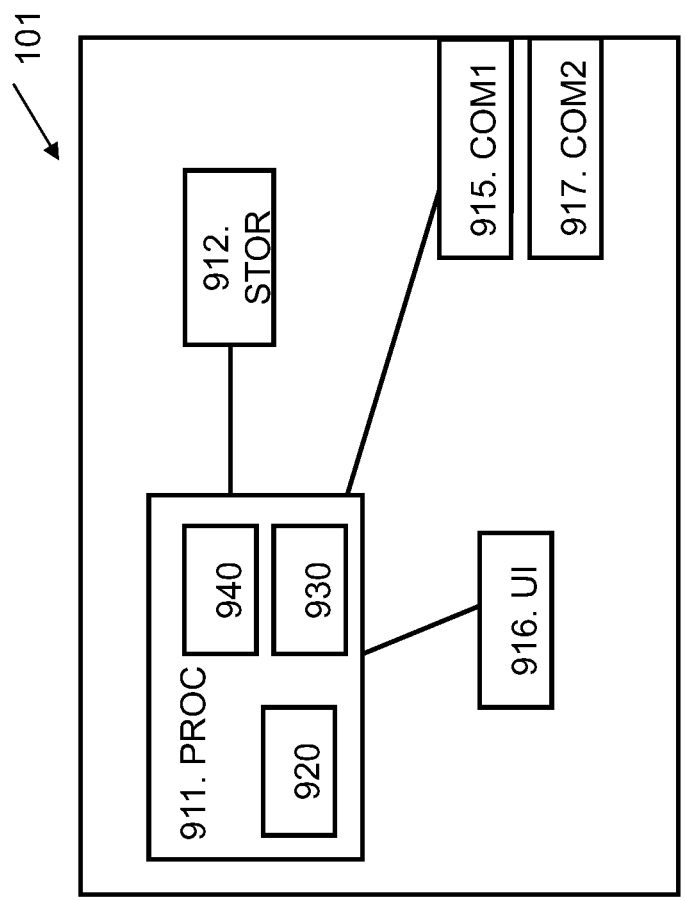

With reference to FIG. 9, the first UE 101 comprises a processing unit (PROC) 911 arranged to operate instruction sets, stored in a memory (STOR) 912, for handling an optional User Interface (UI) 916, and communicating wirelessly with a network node or other second UEs 103 via a communication interface module (COM1) 915. The examples used for processing device and memory in relation to core network node as related to FIG. 7 are also applicable for the first UE 101 in FIG. 9. The communication interface 915 may be a suitable wireless radio technology such as for instance LTE based but also WCDMA, UMTS Terrestrial Radio Access (UTRA) Frequency Division Duplexing (FDD), UTRA Time Division Duplexing (TDD), GSM, GSM EDGE Radio Access Network (GERAN), EDGE, or similar. The processing unit 911 may comprise a communication control module 920, a network address handling module 930, and an operating module 940 for handling the procedures of the first UE 101. The network address handling module 930 is handling address specific connection processes with second UEs 103 connected to the first UE 101 using a short range wireless communication protocol. The first UE 101 further comprises a short range wireless communication module/interface (COM2) 917. The communication control module 920 handles communication processes using the wireless communication modules/interface 915, 917.

A first computer program may comprise instructions which, when executed on at least one processor, cause the at least one processor to carry out the method according to at least one of the steps in FIGS. 5 and 6. A first carrier may comprise the first computer program. The first carrier is one of an electronic signal, optical signal, radio signal or computer readable storage medium.

A second computer program may comprise instructions which, when executed on at least one processor, cause the at least one processor to carry out the method according to at least one of the steps in FIGS. 5 and 7. A second carrier may comprise the second computer program, and the second carrier is one of an electronic signal, optical signal, radio signal or computer readable storage medium.

The invention comprises embodiments, which can be implemented in a network node or a combination of several network nodes and a UE. The methods may be implemented as software arranged to execute as instructions sets in the processing units and stored in the memory or computer readable storage unit of the node(s) involved.

For both the UE and core network nodes, the processor is arranged to prepare and initiate transmission of data and control messages as related to the methods described herein.

Summarized, when a first UE 101 acts as a mobile router, it gets an IP address allocated to the first UE 101 as a router and is denoted "IP_router". The IP addresses of the second UEs 103 attached to the first UE 101 are within the subset specified in a framed route, and these IP addresses are denoted "IP_deviceX" where x is 1, 2 .... The IP address may be an IPv4 or an IPv6 address.

When the second UEs 103 attached to the first UE 101 send uplink traffic, they may use IP_deviceX, which is different from IP_router. And when the PGW/GGSN 107 receives a packet with a destination address matching the framed route, the packet is forwarded to the first UE 101 through the associated PDN session, and finally to the second UEs 103 attached to the first UE 101.

It should be noted that functionality of the core network nodes may be implemented as Network Functions Virtualization (NFV) solutions and located at any suitable location in the core network or external networks, e.g. a PGW/GGSN 107 may be a specific hardware node or a software solution implemented in a suitable hardware node potentially collocated together with other core node software implementations.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method in a Policy and Charging Rules Function, PCRF, for achieving service differentiation for a second User Equipment, UE, attached to a first UE acting as a mobile router, the method comprising:
receiving, from a further node, a request for establishing a Packet Data Network, PDN, connection for the first UE, the request comprising routing information of the first UE;
receiving, from an Application Function, AF, a request for resource reservation for a service based on a request from the second UE, the request comprising an Internet Protocol, IP, address of the second UE; and
correlating the routing information of the first UE with the IP address of the second UE.

2. The method of claim 1, wherein the routing information comprises an IP address and a framed route of the first UE, and wherein the correlating further comprises:
correlating the framed route of the first UE with the IP address of the second UE.

3. The method claim 1, further comprising:
sending a resource reservation request to a Packet Data network Gateway/General Packet Radio Service Gateway Serving Node, PGW/GGSN, over a Gx interface, wherein the resource reservation request comprises the correlation of the routing information of the first UE with the IP address of the second UE.

4. The method of claim 3, wherein the resource reservation request is a re-authorization request to the PGW/GGSN for a service requested from the AF.

5. The method of claim 1, wherein the correlating further comprises:
obtaining a Gx session corresponding to the routing information of the first UE.

6. The method of claim 1, wherein the correlating further comprises:
indicating the IP address of the second UE in the routing information of the first UE.

7. The method of claim 1, further comprising:
performing Gx-Rx session binding.

8. The method of claim 1, wherein the further node is a Packet Data Network Gateway/General Packet Radio Service Gateway Serving Node, PGW/GGSN.

9. The method of claim 1, wherein the further node is a Subscription Profile Repository/User Data Repository, SPR/UDR.

10. The method of claim 1, wherein the routing information of the first UE comprises routing information to be configured for the first UE on a Network Access Server, NAS.

11. The method of claim 1, wherein the routing information of the first UE comprises a framed route or a framed Ipv6 route.

12. The method of claim 11, wherein the framed route or framed IPv6 route is received from a radius server.

13. A Policy and charging rules function, PCRF, for achieving service differentiation for a second User Equipment, UE, attached to a first UE acting as a mobile router, the PCRF being configured to:
receive from a further node a request for establishing a Packet Data Network, PDN, connection for the first UE, the request comprising routing information of the first UE;
receive from an Application Function, AF, a request for resource reservation for a service based on a request from the second UE, the request comprising an Internet Protocol, IP, address of the second UE; and to
correlate the routing information of the first UE with the IP address of the second UE.

14. The PCRF of claim 13, wherein the routing information comprises an IP address and a framed route of the first UE, and wherein the PCRF is configured to:
correlate the framed route of the first UE with the IP address of the second UE.

15. A method in a Packet Data Network Gateway/General Packet Radio Service Gateway Serving Node, PGW/GGSN, for achieving service differentiation for a second User Equipment, UE, attached to a first UE acting as mobile router, the method comprising:
receiving a resource reservation request from a Policy and Charging Rules Function, PCRF, for a service requested from an Application Function, AF, the resource reservation request comprising correlated routing information of the first UE with an Internet Protocol, IP, address of the second UE; and
creating or updating a dedicated bearer for the service requested from the AF.

16. The method of claim 15, wherein the resource reservation request is a re-authorization request to the PGW/GGSN for a service requested from the AF.

17. The method of claim 15, wherein the resource reservation request is received from the PCRF over a Gx interface.

18. The method of claim 15, wherein the correlated routing information further comprises information indicating the IP address of the second UE in the routing information of the first UE.

19. The method of claim 15, wherein the routing information of the first UE comprises routing information to be configured for the first UE on a Network Access Server, NAS.

20. The method of claim 15, wherein the routing information of the first UE comprises a framed route or a framed IPv6 route.

21. The method of claim 20, wherein the framed route and framed IPv6 route is received from a radius server).

22. The method of claim 15, further comprising:
performing routing for downlink traffic based on the IP address of the second UE.

23. A Packet Data Network Gateway/General Packet Radio Service Gateway Serving Node, PGW/GGSN, for achieving service differentiation for a second User Equipment, UE, attached to a first UE acting as a mobile router, the PGW/GGSN being configured to:
receive a resource reservation request from a Policy and Charging Rules Function, PCRF, for a service requested from an Application Function, AF, the resource reservation request comprising correlated routing information of the first UE with an Internet Protocol, IP, address of a second UE; and to
create or update a dedicated bearer for the service requested from the AF via PCRF.

24. The PGW/GGSN of claim 23, wherein the resource reservation request is a re-authorization request to the PGW/GGSN for a service requested from the AF.

25. A computer program product comprising a non-transitory computer readable medium storing instructions which, when executed on at least one processor, cause the at least one processor to carry out the method of claim 1.

26. A computer program product comprising a non-transitory computer readable medium storing instructions which, when executed on at least one processor, cause the at least one processor to carry out the method of claim 15.

* * * * *